United States Patent [19]

Patterson

[11] 3,806,605

[45] Apr. 23, 1974

[54] LOW FAT WHIP TOPPING

[76] Inventor: Bernard A. Patterson, 4040 N. Leclaire Ave., Chicago, Ill. 60641

[22] Filed: Apr. 28, 1971

[21] Appl. No.: 138,325

[52] U.S. Cl. .............................................. 426/163
[51] Int. Cl. .............................................. A23l 1/14
[58] Field of Search ...................................... 99/139

[56] References Cited
UNITED STATES PATENTS

| | | | |
|---|---|---|---|
| 3,431,117 | 3/1969 | Lorant | 99/139 |
| 3,346,387 | 10/1967 | Moncrieff | 99/139 |
| 3,365,305 | 1/1968 | Hunter | 99/139 |
| 3,224,883 | 12/1965 | Pader et al | 99/139 |
| 3,479,190 | 11/1969 | Ganz | 99/139 |

Primary Examiner—A. Louis Monacell
Assistant Examiner—J. M. Hunter
Attorney, Agent, or Firm—Hill, Sherman, Meroni, Gross & Simpson

[57] ABSTRACT

A temperature-stable, whippable composition characterized by its ability to undergo repeated freezing and thawing cycles without adverse effects, the composition containing controlled amounts of at least one edible vegetable glyceride fat, a combination of mono- and diglycerides and lactylic esters of fatty acids, at least one non-toxic, non-ionic emulsifying agent, a milk soluble sodium alginate, calcium gluconate, starch, sugar, salt, hydroxypropyl cellulose, and the balance substantially water.

2 Claims, No Drawings

3,806,605

LOW FAT WHIP TOPPING

BACKGROUND OF THE INVENTION

Synthetic (non-dairy) emulsions suitable for use as a topping for salads and desserts have heretofore been suggested, but one of the drawbacks of synthetic whips of this type has been their inability to prevent separation or aggregation of fats after freezing and thawing. Another drawback which was exhibited by these compositions was their tendency to break down and exhibit syneresis at high temperatures above 200°F., so that it was not possible to produce sterile products.

In my prior U.S. Pat. No. 3,353,965 issued Nov. 21, 1967, I described a high fat emulsion which is stable after freezing and thawing, and including a blended mixture of an edible vegetable glyceride fat, sugar, a non-toxic, non-ionic surface active emulsifying agent, water, and stearyl monoglyceridyl citrate as a stabilizer. While this type of emulsion is quite satisfactory, it is essentially a high fat composition which is not suitable, as such, in the preparation of low fat emulsions.

SUMMARY OF THE INVENTION

I have now discovered that through suitable control of the ingredients, a low fat emulsion composition can be produced which has excellent high temperature and low temperature properties. At the high end, the materials of the present invention can be heated to temperatures on the order of 300°F. without deterioration, thereby making it possible to package the composition as a sterile product. At the low end, the new low fat compositions can be repeatedly frozen and thawed without separation occurring.

The temperature stable, whippable composition of the present invention may include from about 8 to 20% by weight of at least one edible vegetable glyceride fat, a combination of lactylic esters of fatty acids and mono- and diglycerides of fatty acids in amounts up to 0.65%, at least one non-toxic, non-ionic emulsifying agent in an amount up to 0.80%, a milk soluble sodium alginate in an amount up to 0.60%, calcium gluconate in an amount up to 0.30%, starch in an amount up to 1%, sugar in amounts up to 20%, salt (sodium chloride) in an amount up to 0.40%, hydroxypropyl cellulose in an amount up to 0.1%, and the balance substantially water. In the preferred forms of the present invention, two vegetable glyceride fats are used, one having a melting point below about 110°F., and the other having a melting point above 110°F. The non-ionic emulsifying agent is also preferably made up of two materials, one being sorbitan monostearate and the other being an ethoxylated sorbitan monostearate. Preferably, two different types of sugars are used, one being sucrose and the other dextrose.

DESCRIPTION OF THE PREFERRED EMBODIMENTS

In the preferred form of the present invention, I make use of edible vegetable glyceride fats in combination, one having a melting point below 110°F., and the other having a melting point above 110°F. The purpose of providing a mixture of fats is to secure the proper feel in the mouth. I particularly prefer to employ either hydrogenated coconut oil, or palm oils, or mixtures of the two. Some domestic oils can be tolerated in the composition, such as cottonfeed oil, but I prefer to limit the use of such oils to about 2% of the total oil content. The best compositions which I have prepared contain about 10 to 15% by weight of the lower melting edible vegetable glyceride fat, and 2 to 5% by weight of the higher melting material.

The lactylic esters of fatty acids combined with mono- and diglycerides of fatty acids are commercially available materials sold under the same "Marvic acid" by the Glidden-Durkee Company. The fatty acid lactylate compositions which are the essential ingredients of this component have been described in the Thompson et al. U.S. Pat. No. 2,789,992 issued Apr. 23, 1957. As described in that patent, these esters can be prepared by heating a halide of a long chain (16 to 22 carbon atoms) fatty acid with a lactylic acid composition of the desired degree of polymerization under substantially anhydrous conditions. The combination of the fatty acid-lactylic esters with mono- and diglycerides have been described in Moncrieff et al. U.S. Pat. No. 3,346,387, issued Oct. 10, 1967. This patent describes a blend of about 40% to about 80% by weight of stearyl and palmityl (mono) lactylic acids and about 20% to about 60% by weight of free stearic and palmitic acids, utilizing a promoter consisting of fatty acid, mixed mono- and diglycerides having an iodine value not above about 20%. About 0.1 to 7 parts of the blend of lactylic acids and free fatty acids is present per part of the mixed mono- and diglycerides, with the ratio of monoglycerides to diglycerides being between about 0.2 to 1 to 9 to 1.

The preferred emulsifying composition contains both sorbitan monostearate (sold commercially as "Span 60") and ethoxylated sorbitan monostearate (sold commercially as "Tween 60"). These materials are non-toxic and non-ionic. Other suitable materials are the normally long chain fatty acid esters of polyhydric alcohols, the ester group containing about 10 to 24 carbon atoms per molecule. Still other materials which can be used are polyoxyethylene derivatives of fatty acid partial esters of hexitol anhydrides, and polyoxyethylene derivatives of other fat forming fatty acids.

The stabilizers which are employed in accordance with the present invention contribute a great deal to the temperature stability of the material. One of the stabilizers employed is a milk soluble sodium alginate of the type marketed under the trademark "Dariloid" by Kelco Company. This material has a viscosity, in 2% solution, of 50 to 300 centipoise at room temperature. A 2% water solution of the material has a pH of from 9.8 to 10.2.

The sugars used in the compositions of the present invention are preferably a blend of sucrose and dextrose derived from corn sugar. The latter serves to reduce the gloss of the composition, and to make it softer.

Another important stabilizer added to the compositions of the present invention is hydroxypropyl cellulose. This material is available commercially under the trademark "Klucel" and is marketed by Hercules Incorporated. Hydroxypropyl cellulose is manufactured by reacting alkali cellulose with propylene oxide at elevated temperatures and pressures. The propylene oxide can be substituted on the cellulose through an ether linkage at the three reactive hydroxyls present on each anhydroglycose monomer unit of the cellulose chain. It appears that the etherification takes place in such a way that the hydroxypropyl substituent groups contain almost entirely secondary hydroxyls. The secondary hydroxyl present in the side chain is available for further reaction with propylene oxide, resulting in the formation of chains. For the purposes of the present invention, I employ a hydroxypropyl cellulose which has a hydroxypropyl substitution not greater than 4.6 hydroxypropyl groups per anhydroglucose unit. This material has a viscosity of about 150 to 400 centipoises in a 2% aqueous solution at 25°C.

Within the broader ranges stated previously, the particularly preferred compositions of the present invention have the following ranges of ingredients:

| | |
|---|---|
| Low melting (110°F. or below) edible vegetable glyceride fat | 10–15% by weight |
| Higher melting edible vegetable glyceride fat | 2–5% |
| Mono- and diglycerides and lactylic esters of fatty acids | 0.40 to 0.65% |
| Sorbitan monostearate | 0.25 to 0.40% |
| Ethoxylated sorbitan monostearate | 0.15 to 0.40% |
| Sodium alginate | 0.25 to 0.60% |
| Calcium gluconate | 0.15 to 0.30% |
| Starch | 0.30 to 1.0% |
| Salt | 0.25 to 0.40% |
| Sucrose | 8 to 16% |
| Dextrose | 2 to 6% |
| Hydroxypropyl cellulose | .01 to .10% |
| Flavor and color | as desired |
| Water | to 100% |

Within the ranges given above, the following represents a particularly preferred composition;

| | |
|---|---|
| "Hydrol" 100° fat | 13% |
| "Paramount CL" fat | 2% |
| "Marvic Acid, E C187M" | .50% |
| "Span 60" | .30% |
| "Tween 60" | .20% |
| "Dariloid" | .35% |
| Calcium gluconate | .20% |
| Starch | .35% |
| Salt | .30% |
| Sucrose | 12% |
| Corn sugar (dextrose) | 2.38% |
| "Klucel" | .02% |
| Flavor and color | Optional |
| Water | Balance |

The ingredients should be properly blended if the best results are to be obtained. In the first step, the water is heated to a temperature of about 150°F. The sugar is added to the 150°F. water, and agitated into it until thoroughly dissolved. The stabilizers are then added to the water-sugar solution at 150°F. and agitated until thoroughly dissolved. Then, the fat and emulsifiers which have been pre-liquefied are added into the total emulsion, and mixed until thoroughly dissolved. Next, the flavor material is added with agitation at a temperature of approximately 150°F. The material is then ready for homogenization. Typically, the material may be homogenized in a first stage at 1,500 to 2,000 pounds per square inch, and in the second stage at 500 pounds per square inch after a sterilization heat treatment. Finally, the material is cooled to 50°F. or lower and then canned or packaged.

It has been found that the composition of the present invention provides a stable, whippable vegetable fat composition which can be repeatedly frozen and thawed without separation occurring, and which can also be sterilized at temperatures on the order of 300°F., permitting aseptic packaging.

I claim as my invention:

1. A temperature stable whippable composition comprising about 10 to 15% by weight of a low melting edible vegetable glyceride fat, from 2 to 5% of a higher melting edible vegetable glyceride fat, from 0.40 to 0.65% of a mixture of lactylic esters of fatty acids and mono- and diglycerides of fatty acids, from 0.25 to 0.40% of sorbitan monostearate, from 0.15 to 0.40% of ethoxylated sorbitan monostearate, from 0.25 to 0.60% of a milk soluble sodium alginate, from 0.15 to 0.30% calcium gluconate, from 0.30 to 1.0% starch, from 0.25 to 0.40% salt, from 8 to 16% sucrose, from 2 to 6% dextrose, from 0.01 to 0.10% hydroxypropyl cellulose, and the balance substantially water.

2. The composition of claim 1 in which said hydroxypropyl cellulose has a hydroxypropyl substitution not greater than 4.6 hydroxypropyl groups per anhydroglucose unit.

* * * * *